Patented Apr. 6, 1954

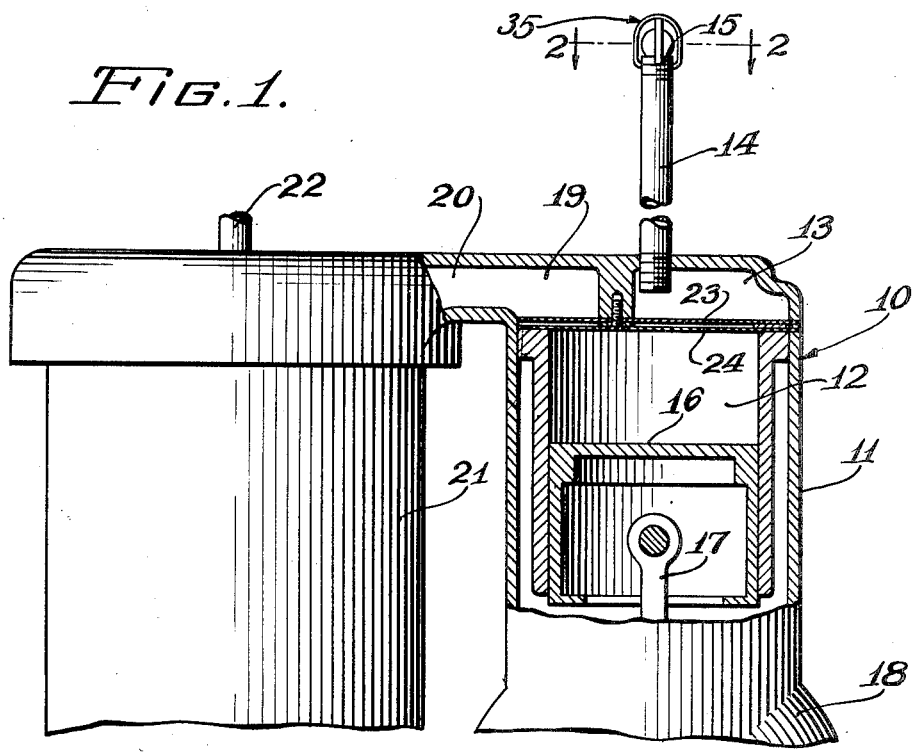
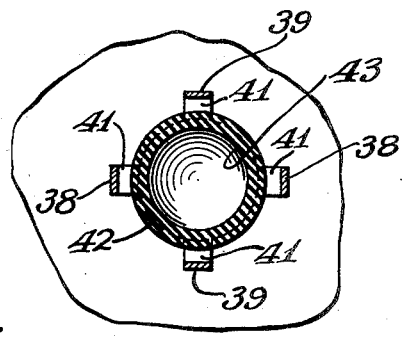
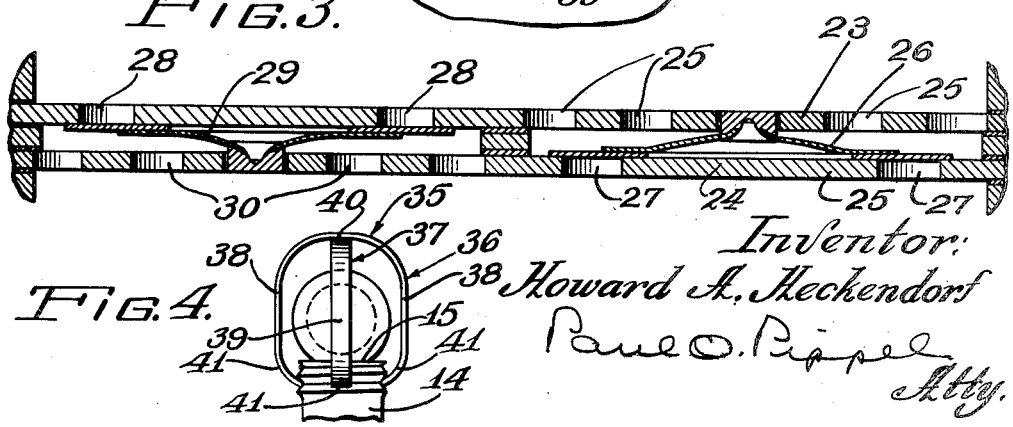

2,674,406

UNITED STATES PATENT OFFICE 2,674,406

SILENCING DEVICE FOR VACUUM PUMPS

Howard A. Heckendorf, Chicago, Ill., assignor to International Harvester Company, a corporation of New Jersey Application October 7, 1950, Serial No. 189,037

3 Claims. (Cl. 230—232)

This invention relates to a silencing device for a vacuum pump.

The particular vacuum pump to which this invention is especially applicable is a pump of a type generally used in milking installations. In the Hodsdon Patent 1,964,515 patented June 26, 1934, a vacuum pump for milking installations is disclosed. This pump generally consists of a casing having a cylinder in which a piston is mounted for reciprocation. A pair of valve plates, are positioned between the cylinder and vacuum and exhaust chambers. An outlet pipe is connected to the exhaust chamber and the vacuum chamber is in turn connected to a vacuum tank. The valves of the valve plates are so arranged that when the piston is moved in a downward stroke air is drawn from the vacuum chamber and the vacuum tank, this air being subsequently discharged through the exhaust chamber and through the conduit to the atmosphere on the upstroke of the piston.

It has been found that pumps of this type are exceptionally noisy and that their operation results in a barking sound which is disconcerting to the animals which may be milked by the milking installation of which the pump is a part. As the air is expelled or evacuated through the exhaust pipe, this evacuation takes place under a great velocity or momentum which has a tendency to cause a negative pressure within the exhaust pipe. Thus, immediately after the piston has operated in its exhaust stroke, a negative pressure exists within the conduit, for a fraction of time, causing air to be drawn into the pipe. The operation of the pistons is very fast and as the piston again expels air from the exhaust chamber the air which is drawn into the pipe and the air which is expelled meet within the conduit thus causing a disagreeable barking sound. Applicant's prime object is to provide a simple and inexpensive silencing device which can be easily and quickly attached to the conduit for silencing this objectionable noise caused during the operation of the vacuum pump.

Still another object is to provide a silencing device for a vacuum pump, the device including a cage structure which is constructed to confine a resilient ball, the cage being adapted for connection over the exhaust conduit of a vacuum pipe in a manner wherein the ball is adapted to seat over the conduit pipe during a certain time interval in the operation of the vacuum.

These and other objects will become more clearly apparent from a reading of the description when examined in connection with the accompanying sheet of drawing.

In the drawing:

Fig. 1 is a side elevational view of a vacuum pump having portions thereof broken away to show the internal structure of the pump, the pump having a silencing device connected thereto.

Fig. 2 is a cross sectional view through a silencing device, the view being taken substantially along the lines 2—2 of Fig. 1.

Fig. 3 is a cross sectional view, in elevation, taken through a pair of vertically spaced valve plates of a vacuum pump.

Fig. 4 is a side elevational view showing a novel silencing device connected to the exhaust conduit of a vacuum pump.

Referring particularly to Fig. 1, a vacuum pump is generally designated by the reference character 10. The pump 10 is generally of similar construction as the disclosure shown in the above mentioned patent to Hodsdon. The pump 10 consists of a casing 11 in which an upright cylinder 12 is disposed. Above the cylinder 12 is situated an exhaust chamber 13, the exhaust chamber 13 being normally in communication with the atmosphere through a pipe or conduit 14. This conduit 14 is normally open at its upper extremity as indicated at 15.

A piston 16 is positioned for reciprocation within the cylinder 12. The piston is actuated by a conventional type of piston rod 17 which may be operated by means of a motor, not shown, disposed within a motor casing 18. A vacuum chamber 19 is positioned above the cylinder 12, this chamber having a connecting passage 20 which is in communication with a vacuum tank 21. The vacuum tank 21 may be connected to a milking system by means of a conduit 22.

The exhaust chamber 13 and the vacuum chamber 19 are separated from the cylinder 12 by means of upper and lower valve plates 23 and 24 respectively. As best indicated in Fig. 3, the upper valve plate 23 is provided at its right-hand side with openings 25. A spring valve 26 is interposed between the valve plates 23 and 24, this spring valve normally being seated over openings 27 which lead into the cylinder 12. The left-hand side of upper valve plate 23 is provided with openings 28. A valve 29 is interposed between the plates 23 and 24, this valve 29 normally being seated to cover the openings 28. Openings 30 are provided at the left-hand side of the lower valve plate 24, these openings normally being in communication with the cylinder 12. This description of the vacuum pump is believed to be sufficiently adequate when considered in connection with the above mentioned patent which shows a more complete disclosure.

A silencing device generally consists of a cage 35. The cage 35 comprises a pair of U-shaped strips 36 and 37, the strip 36 having oppositely disposed leg portions 38 and the strip 37 having oppositely disposed leg portions 39. The leg portions 38 and 39 are circumferentially spaced with respect to one another, the strips 36 and 37 being suitably welded together as indicated at 40. The lower free ends of the legs 38 and 39 are bent arcuately inwardly toward each other as indicated at 41. A rubber-like ball 42 is confined within the cage 35 by means of the legs 38 and 39. The inwardly bent ends 41 of the legs 38 and 39 serve to retain the rubber ball 42 within the cage when the silencing device is detached with respect to the vacuum pump.

As best shown in Figs. 1 and 4, the upper end of the conduit 14 is threaded. The inwardly bent ends 41 of the legs 38 and 39 may be threaded onto the threaded end of the conduit 14 to securely connect the cage in place. The rubber-like ball 42 is hollow as indicated at 43 and therefore is sufficiently light and resilient to respond to the exhaust and vacuum strokes of the pump.

In the operation the cylinder 16 on its down stroke causes a negative pressure within the cylinder 12 whereupon the valve 29 is drawn away from the openings 28 and air is evacuated from the vacuum tank 21. Upon its up stroke the pressure created within the cylinder 12 causes the valve 26 to open upwardly whereby the air is discharged through the openings 27 and 25 into the exhaust chamber 13. The air is thereupon discharged under great momentum or velocity through the conduit 14, at this point the ball 42 being displaced from the open end 15 of the conduit 14. Without the utilization of the silencing device the rapid discharge of air through the conduit 14 would cause a negative pressure to take place within said conduit. This would normally cause a certain amount of air to rush in. Thus upon the succeeding exhaust stroke of the piston the air which would be discharged through the conduit would meet with the incoming air to cause a disagreeable barking sound. The silencing device shown prevents this action since immediately after the exhaust stroke, and upon the lowering of the piston 16 the ball 42 seats over the opening 15 of the conduit 14, by gravity, thereby effectively sealing and closing said conduit. Thus the air which normally would rush into the conduit 14 following the exhaust stroke is prevented from entering into the conduit and the barking or objectionable noise is eliminated. In view of the rapid reciprocation of the piston 16 within the cylinder 12, the upward and downward movement of the ball 42 is very rapid, the ball effectively sealing the conduit 14 immediately after each termination of the exhaust stroke.

It is believed that a novel, inexpensive and effective silencing device for vacuum pumps has been disclosed. It must be understood that changes and modifications may be made which do not depart from the spirit of the invention as disclosed and the scope thereof as defined in the appended claims.

What is claimed is:

1. In combination with a vacuum pump having an exhaust chamber and a vertically extending conduit connected to said chamber, the conduit having an open end in communication with the atmosphere, of a silencing device comprising a retaining cage including a plurality of horizontally spaced and circumferentially disposed vertical strips connected together, said cage being adapted to connect over the open end of said outlet conduit and a ball confined within the cage, said ball having a larger cross sectional diameter than the open end of the conduit, the ball being adapted to gravitate and seat over the open end of the conduit for sealing the conduit from the atmosphere immediately after the exhaust stroke of said pump.

2. In combination with a vacuum pump having an exhaust chamber and a vertically extending conduit connected to the exhaust chamber, the conduit having an open threaded end in communication with the atmosphere, of a silencing device comprising a retaining cage including a plurality of U-shaped members having oppositely disposed leg portions connected together and circumferentially spaced with respect to each other, a rubber-like ball confined within said cage, said ball having a larger cross sectional diameter than the open end of said conduit, the ball being adapted to gravitate and seat over the open end of the conduit for sealing the conduit from the atmosphere immediately after the exhaust stroke of said pump.

3. A silencing device in accordance with claim 2, the leg portions being constructed of a spring-like material, the lower ends of said leg portions being bent inwardly toward the ball, the lower ends of said legs resiliently engaging the threaded end of the conduit adjacent its open end whereby the cage may be supported on the conduit.

References Cited in the file of this patent

UNITED STATES PATENTS

| Number | Name | Date |
|---|---|---|
| 947,431 | De Grandsagne | Jan. 25, 1910 |
| 1,596,520 | Eskholme et al. | Aug. 17, 1926 |
| 2,136,098 | Browne | Nov. 8, 1938 |
| 2,354,255 | Gillum et al. | July 25, 1944 |